Feb. 7, 1939.  L. LAWSON  2,146,676
COMBINATION DUMPING END GATE AND CHUTE FOR VEHICLES
Filed May 23, 1936  2 Sheets-Sheet 1
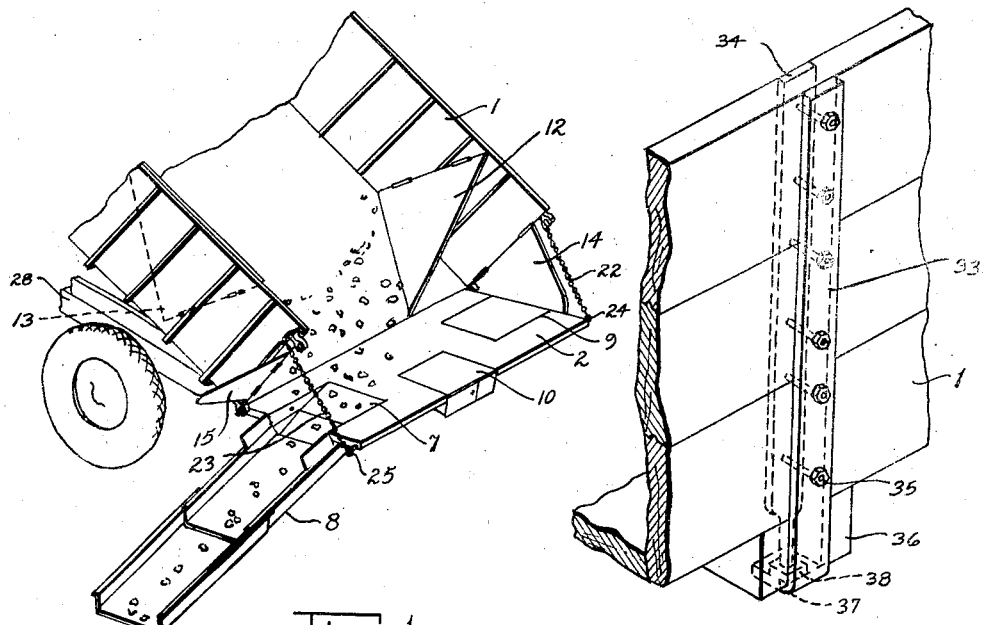
Fig. 1.
Fig. 9.
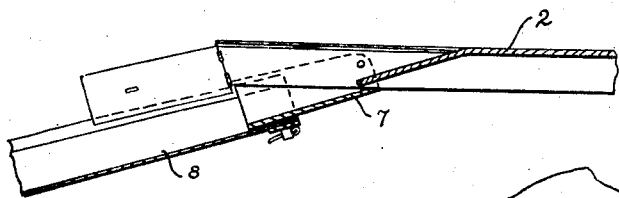
Fig. 2.
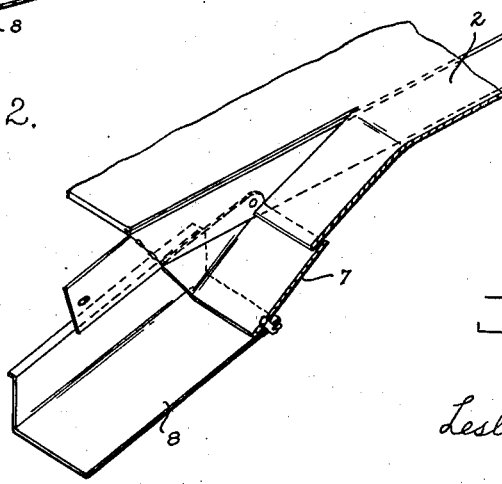
Fig. 3.
Leslie Lawson
INVENTOR.
BY A. B. McCall
ATTORNEYS.

Feb. 7, 1939.  L. LAWSON  2,146,676
COMBINATION DUMPING END GATE AND CHUTE FOR VEHICLES
Filed May 23, 1936  2 Sheets-Sheet 2
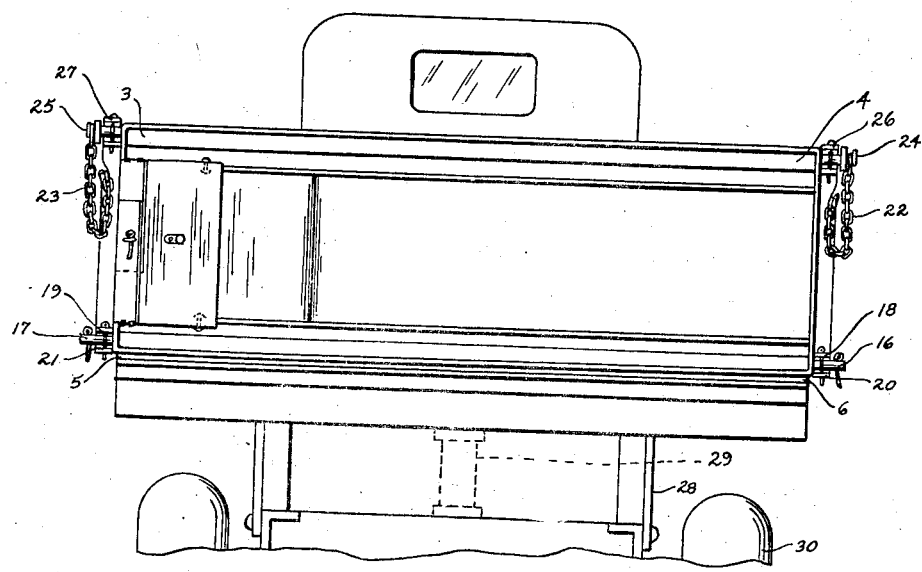
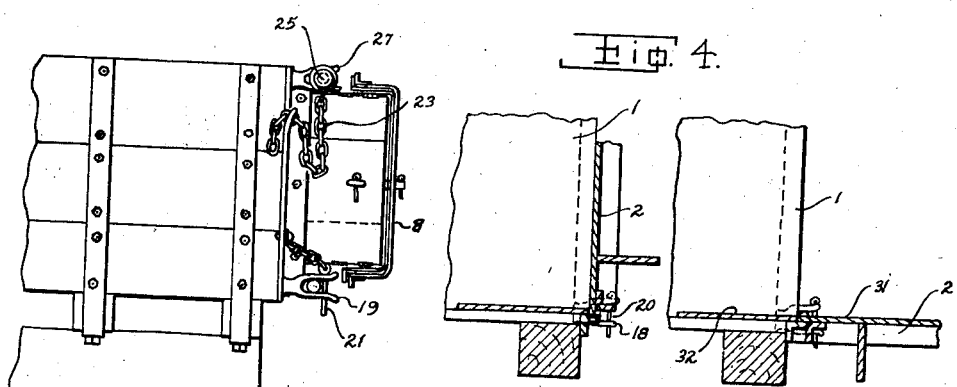
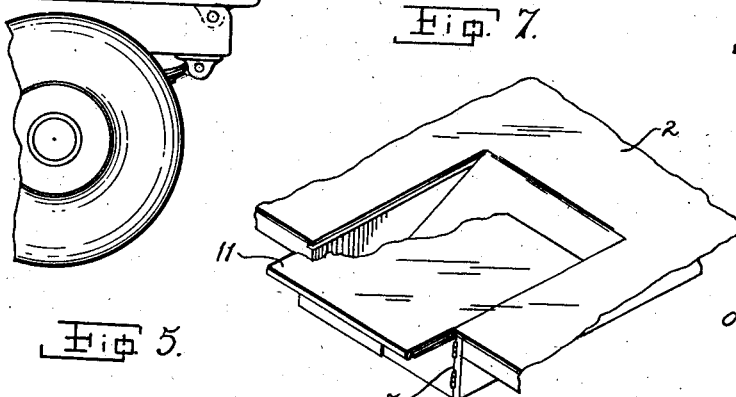
Leslie Lawson
INVENTOR.
BY A.B. McCall
ATTORNEYS.

Patented Feb. 7, 1939

2,146,676

UNITED STATES PATENT OFFICE 2,146,676

COMBINATION DUMPING ENDGATE AND CHUTE FOR VEHICLES

Leslie Lawson, Springfield, Ill., assignor of one-fourth to Leonard Dudleston, Springfield, Ill.

Application May 23, 1936, Serial No. 81,459

1 Claim. (Cl. 298—7)

My invention relates to improvements in vehicles wherein a body for hauling various commodities may be used and wherein provision may be made for dumping such commodities from the body when unloading the same: an object being in my invention to provide improvements in a truck body, adapted to haul coal, grain, dirt and the like, wherein the same may be dumped from the truck body conveniently and successfully without the need of scooping it all out.

A further object of my invention is to provide such improvements in a dumping body for trucks as will permit such coal, grain, dirt and the like, hauled therein to be dumped from chutes that are built into the end gate thereof so that such materials may be quickly and conveniently dumped from the body when the body is tipped up and dumped from one side or the other or off to the back through chutes that are operatively defining a portion of the end gate.

A particular purpose of my invention is to provide an improvement in dumping trucks, wherein is found the combination of dumping chutes and dumping end gate which will permit commodities that are commonly hauled in a dumping truck to be quickly and successfully dumped therefrom without having to be scooped from the truck body and at the same time guided to the dumping place to one side or the other of the truck or to the rear in a convenient manner.

I attain the object of my invention by the device described in the annexed specification, recited in the claims and illustrated in the accompanying drawings wherein like reference numerals indicate like parts in the several figures.

Referring to the figures:

Fig. 1 is a perspective of my invention disclosing the salient features thereof.

Fig. 2 is a detail disclosing in a section through one of the chute members on my end gate a detail of the construction thereof.

Fig. 3 is a perspective of one of the chute members constructed in a manner defining a portion of the dumping end gate for a dumping truck.

Fig. 4 is a detail of the rear end view of a dumping truck disclosing the dumping end gate and the pivoted support therefor as well as the dumping chute provided at one end of the dumping end gate.

Fig. 5 is a detail of a rear portion of a side view of the dumping truck disclosed in Figure 4 and illustrating the end view of the end gate shown in that figure.

Fig. 6 is a perspective illustrating the means by which the dumping chutes are covered by a sliding cover which would be suitable to scoop over if necessary.

Fig. 7 is a detail showing how one of my end gates is fitted up against the rear end of the truck bed so that a scoop can be used over the junction between the two.

Fig. 8 is a detail illustrating how the end gate would look when let down so that the scooping surface thereof is flush with the dumping truck bed providing better scooping facilities at the junction between the two.

Fig. 9 is a perspective illustrating a preferred method of holding the side boards of the truck bed into operative position.

Referring now to the construction of my invention and the preferred manner of operating the same I provide in conjunction with a truck body 1, a dumping end gate 2, operatively pivoted to the body, preferably at the top and bottom corners 3, 4, 5 and 6 of the back end of the truck body.

It is true that some materials that are hauled in the dumping truck are dumped out the back end of the truck body merely by tipping the body after the end gate has been released at its bottom ends so as to permit the same to swing out away from the body bed far enough to let the materials fall out.

However, some materials are hauled in a dumping truck body which need to be guided through chutes to a bin or other receptacle for such materials.

For instance such materials as coal, wheat, corn, oats, dirt and the like can be conveniently carried in a dumping truck body and in some cases it may be desired to dump the same out of the truck body into some receptacle disposed off to one side or the other of the truck; in which case the old well-known method has been to scoop such materials out of the truck body.

For sake of explanation of the invention it may be said that it is quite common when unloading coal into a basement from a truck body, to scoop the coal out of the truck whereas the intended operation of my invention would make it possible to dump such coal into the basement on either side of the truck body by merely tipping the truck body up as shown in Figure 1, so that the coal may slide into chute 7 made into the end gate 2, from which such coal may run into a basement through guide chute members 8. There may be an occasion to use chute 9 at the opposite end of end gate 2 to run the coal into a basement on the opposite side of the truck in which case chute 9 would be used in the same manner as is illustrated for chute 7 and guide chutes 8 would thus be used on the other side of the truck body and secured to chute 9 of the end gate 2 in the manner illustrated in Figure 2 in the same way that it is held in its attachment to chute 7.

It may be desired to have end gate 2 equipped with a central rear chute 10 to which guide chutes 8 may be detachably secured where it may be desired to carefully guard the coal etc. into a bin or receptacle behind the dumping truck body.

As a salient feature of my invention it is desired to provide an end gate 2 with chute members 7, 9, and 10 built into it. There may be cases for instance where only one chute at one end or the other of the end gate would be needed and where the central rear chute may not be desired.

It will be noted in Figure 6 that cover member 11 for chute 7 slidably engaged end gate 2 in a manner permitting such cover to provide a desirable scooping surface on such occasions as may be required to use a scoop on the end gate when the chutes are not in use and this kind of a cover may also be used on chutes 9 and 10 for the same purpose.

In conjunction with dumping body 1 I prefer to provide a wing 12 on one side and 13 on the other to help guide the coal to the proper chutes when dumping the same; while wing members 14 and 15 may be used to help prevent coal and the like from falling out over the end of the end gate. In a careful analysis of wing members 14 and 15 with their upright supporting hinges as may be observed in Figure 1, it will be noted that as constructed in their triangular shape, these two wings are made to operate so that the bottom edge of each will firmly rest against the inner surface of the end gate 2 regardless of the angle to which the end gate may be adjusted about its hinged supports. In actual experience with this construction, these wing members 14 and 15 are found to be a great advantage since they are able to effectively direct the movement of coal and the like from the dumping truck body toward the central portion on the end gate for scooping. In actual experience, the practical operation of my invention shows that these two wing members are decidedly novel and helpful by being able to operate in this manner.

When letting the end gate down in the manner shown in Figure 1 the end gate is pivotally supported by its terminal hinge pins 16 and 17 respectively held in yokes 18 and 19 by pins 20 and 21 while chain members 22 and 23 engage pin members 24 and 25 in the manner shown in Figure 1.

Pins 24 and 25 are supported by yoke members 26 and 27 when the end gate is closed.

In Figure 5 it will be noted that guide chute members 8 may be carried upon the outside of the dumping end gate 2 when this end gate is folded up and in this case the guide chutes 8 hang over the top of chutes 7 and 9 in the end gate when the chutes are not in use.

The dumping truck body 1 is elevated in its dumping position on truck 28 by a hydraulic ram 29 and the truck is supported on wheels 30.

It will be noted in Figure 8 that the scooping plate 31 of end gate 2 is positioned so that when the end gate is let down this plate becomes flushed with the scooping bed 32 of dumping truck body 1 so as to permit a smooth scooping surface where the end gate touches the body bed.

In order that the end gate may fit into place at all times when closed it is essential that the sides of the dumping body be substantially maintained in their erect position and I have provided for this need with a pair of strap members 33 on the outside and 34 on the inside of dumping body 1 and these straps are substantially connected by bolt members 35.

Outer strap member 33 bends in under plate 36 and is provided with a hole through which the lower bolt end 37 of strap 34 extends while a nut 38 on this bolt end 37 is used for tightening up on strap 34 to help keep the side of dumping truck 1 straight.

Thus it will be observed that with my invention there is provided a means of quickly unloading a load of coal into the basement or bin on either side or to the rear of the dumping truck while a dumping truck body equipped with my improved end gate may be used successfully for hauling and conveniently and promptly unloading various small grains, gravel and sand and dirt and the like into side bins or receptacles if desired.

Having thus described the nature of my invention what I claim is:

In a dumping truck body, the combination with a pivotally mounted dumping end gate, of a pair of triangular shaped guard wing members hingedly connected respectively to the rear end of the truck body; said wing members having their bottom edges respectively registering in contact with the bottom inner surface of said end gate and adapted to freely swing on their hinged supports to remain in contact with the inner surface of said end gate in its several positions of pivotal adjustment; whereby coal and other transportable contents of said truck body may be automatically directed to a converging outlet when being dumped from said truck body.

LESLIE LAWSON.